US010264736B2

(12) United States Patent
Rider

(10) Patent No.: US 10,264,736 B2
(45) Date of Patent: Apr. 23, 2019

(54) RADIALLY SLOTTED ANNULAR COUPLING SYSTEM

(71) Applicant: Thriving Systems Design, LLC, Fort Collins, CO (US)

(72) Inventor: Jason E. Rider, Fort Collins, CO (US)

(73) Assignee: Thriving Systems Design, LLC, Fort Collins, CO (US)

( * ) Notice: Subject to any disclaimer, the term of this patent is extended or adjusted under 35 U.S.C. 154(b) by 0 days.

(21) Appl. No.: 15/100,962

(22) PCT Filed: Dec. 9, 2014

(86) PCT No.: PCT/US2014/069376
§ 371 (c)(1),
(2) Date: Jun. 1, 2016

(87) PCT Pub. No.: WO2015/089094
PCT Pub. Date: Jun. 18, 2015

(65) Prior Publication Data
US 2016/0295811 A1    Oct. 13, 2016

Related U.S. Application Data

(60) Provisional application No. 61/989,698, filed on May 7, 2014, provisional application No. 61/963,544, filed on Dec. 9, 2013.

(51) Int. Cl.
*F16B 7/04* (2006.01)
*A01G 9/12* (2006.01)
*F16B 2/20* (2006.01)

(52) U.S. Cl.
CPC .............. *A01G 9/128* (2013.01); *A01G 9/12* (2013.01); *F16B 2/20* (2013.01); *F16B 7/04* (2013.01)

(58) Field of Classification Search
USPC ....... 248/74.2, 229.26, 229.25, 230.6, 230.7, 248/231.71, 231.81, 316.7
See application file for complete search history.

(56) References Cited

U.S. PATENT DOCUMENTS 3,562,847 A    2/1971  Jamison
4,192,477 A    3/1980  Decky et al.
(Continued)

FOREIGN PATENT DOCUMENTS

JP    2006-075091    3/2006
WO   WO 1999/005900    2/1999

OTHER PUBLICATIONS

U.S. Appl. No. 61/963,544, filed Dec. 9, 2013.
(Continued)

*Primary Examiner* — Alfred J Wujciak
(74) *Attorney, Agent, or Firm* — Craig R. Miles; CR Miles P.C.

(57) ABSTRACT

A coupler including an annular body having an annular body outer surface and an annular body inner surface connecting opposed annular body first and second faces, the annular body inner surface bounding an internal opening communicating between the opposed annular body first and second faces; the annular body having opposed annular body first and second ends which connect the annular body outer and inner surfaces and the annular body first and second faces to define a radial slot which communicates with the internal opening; the annular body sufficiently resiliently flexible to provide an adjustable radial slot width of the radial slot; and a plurality of spaced apart teeth radially inwardly projecting from the annular body inner surface.

16 Claims, 12 Drawing Sheets

(56) References Cited

U.S. PATENT DOCUMENTS

| | | | |
|---|---|---|---|
| 4,442,572 A | 4/1984 | Keck | |
| 4,688,961 A * | 8/1987 | Shioda | F16B 7/04 24/336 |
| 4,934,635 A * | 6/1990 | Sherman | F16L 3/10 24/279 |
| 5,146,657 A | 9/1992 | Frano | |
| 5,386,961 A * | 2/1995 | Lu | B62H 5/00 224/425 |
| 6,792,653 B2 | 9/2004 | Protz | |
| 7,111,812 B2 * | 9/2006 | Shannon | H04M 1/04 248/227.3 |
| 7,241,071 B2 * | 7/2007 | Carraher | E04C 5/163 403/164 |
| 8,083,432 B2 * | 12/2011 | Limpert | F16L 3/16 24/336 |
| 8,317,149 B2 * | 11/2012 | Greenburg | A61B 1/00128 248/228.7 |
| 8,960,616 B2 * | 2/2015 | Gibbons | F16M 13/022 248/200 |
| 9,657,894 B2 * | 5/2017 | Gibbons | F16M 13/022 |
| 2009/0321588 A1 * | 12/2009 | Sullivan | F16L 3/1075 248/74.2 |
| 2012/0246990 A1 * | 10/2012 | Taylor | F41C 33/007 42/85 |
| 2016/0275768 A1 * | 9/2016 | Strassburger | B65D 23/14 |

OTHER PUBLICATIONS

U.S. Appl. No. 61/989,698, filed May 7, 2014.

PCT International Patent Application No. PCT/US2014/069376, filed Dec. 9, 2014.

PCT International Patent Application No. PCT/US2014/069376, International Search Report and Written Opinion of the International Searching Authority, dated Mar. 28, 2015.

* cited by examiner

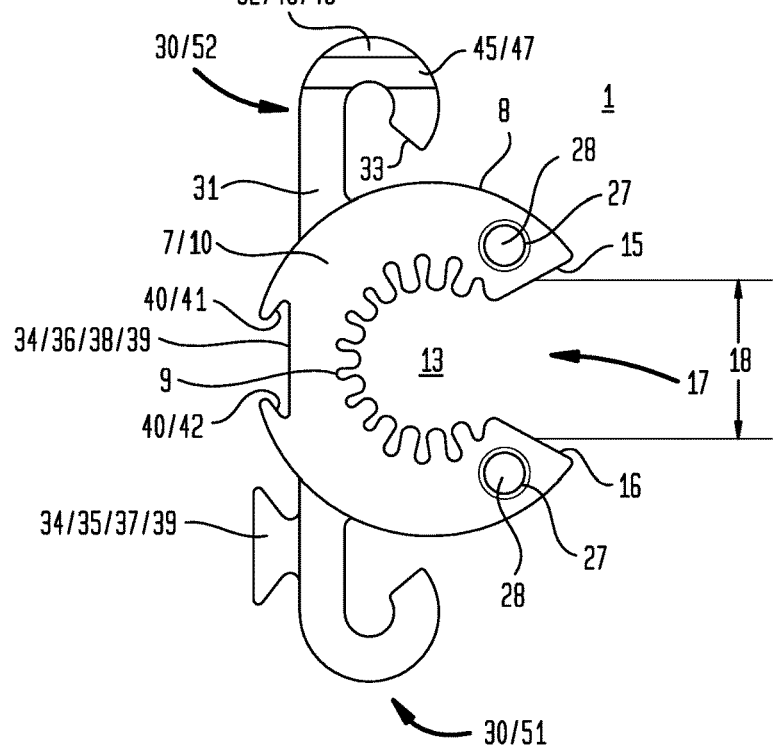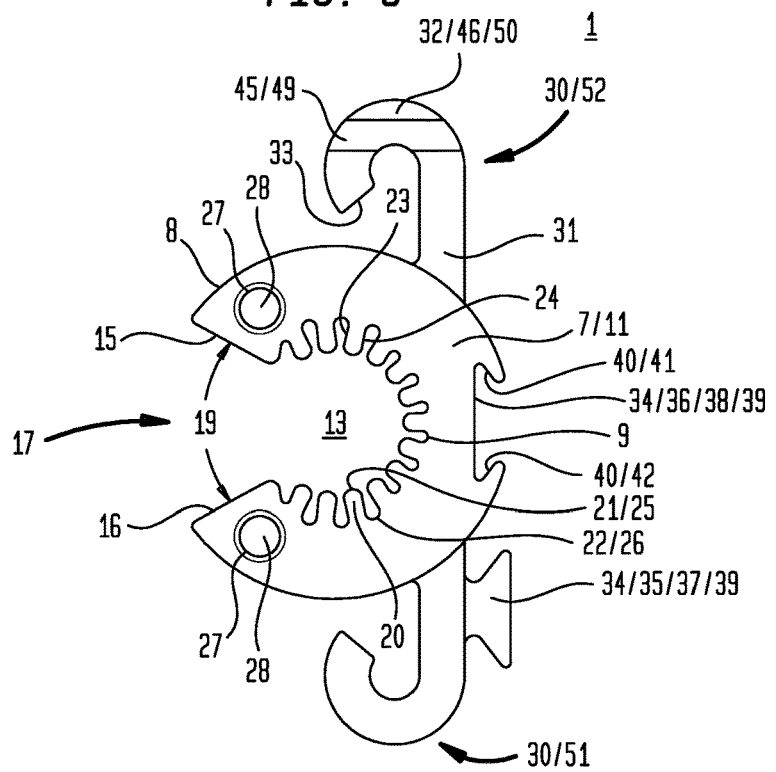

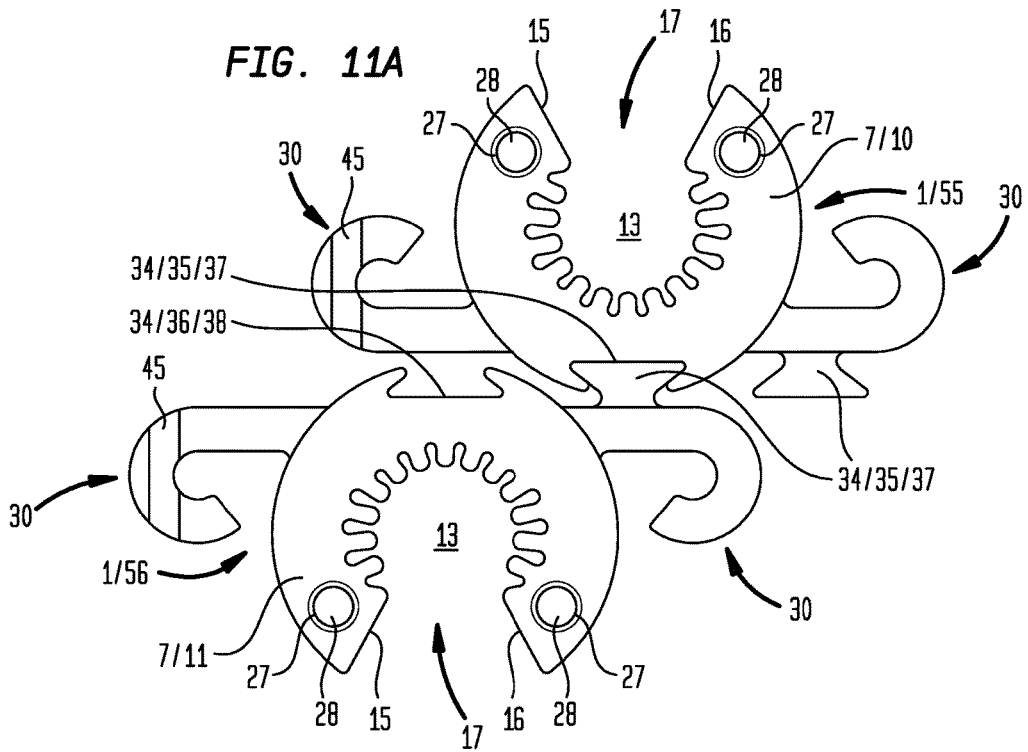
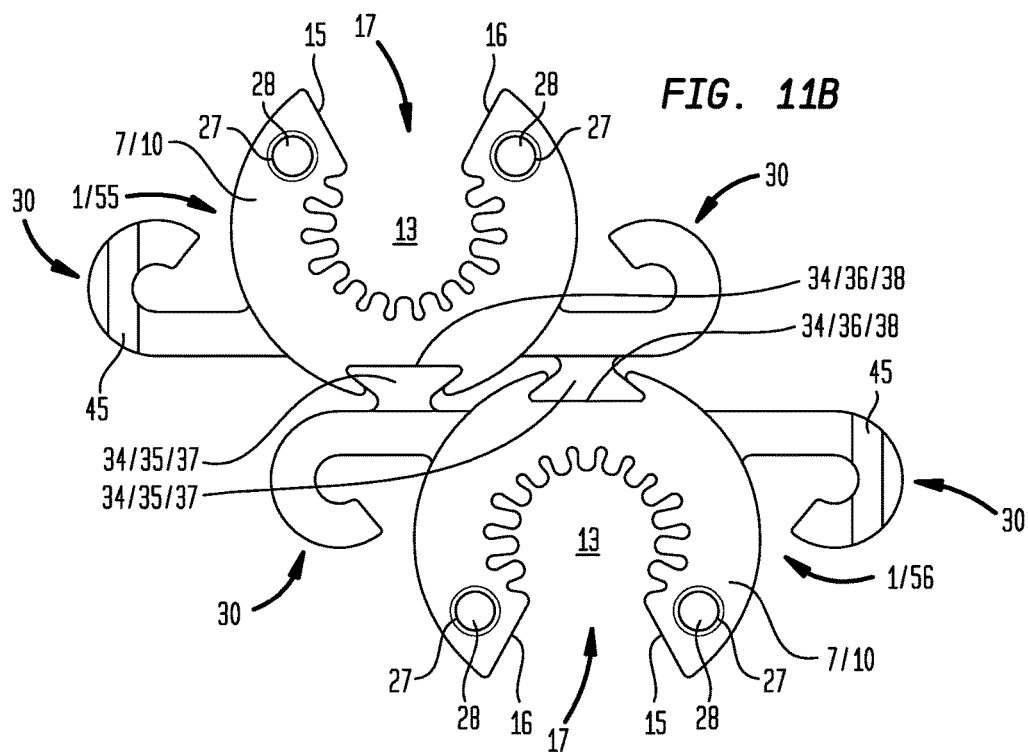

US 10,264,736 B2

RADIALLY SLOTTED ANNULAR COUPLING SYSTEM

This application is the United States National Stage of International Patent Cooperation Treaty Patent Application No. PCT/US2014/069376, filed Dec. 9, 2014, which claims the benefit of U.S. Provisional Patent Application No. 61/989,698, filed May 7, 2014, and U.S. Provisional Patent Application No. 61/963,544, filed Dec. 9, 2013, each hereby incorporated by reference herein.

I. TECHNICAL FIELD

A coupler including an annular body having an annular body outer surface and an annular body inner surface connecting opposed annular body first and second faces, the annular body inner surface bounding an internal opening communicating between the opposed annular body first and second faces; the annular body having opposed annular body first and second ends which connect the annular body outer and inner surfaces and the annular body first and second faces to define a radial slot which communicates with the internal opening; the annular body sufficiently resiliently flexible to provide an adjustable radial slot width of the radial slot; and a plurality of spaced apart teeth radially inwardly projecting from the annular body inner surface.

II. BACKGROUND

When growing various plants, it may be desirable to provide support to portions of the plant, particularly as the plant grows. Support may be useful for training purposes as well as for preventing the plant from being damaged by its own productive weight or by environmental stresses, such as wind, rain, hail, snow, or the like. This can be especially true of young plants or recently transplanted plants.

Conventional methods of providing support to plants may employ connecting a tether, such as string or wire, directly to a stake. However, these conventional methods can be challenging and inconvenient, as it may be difficult to reach the targeted portions of the plant or the stake embedded within a tortuous plant. Also, a tether connected directly to a stake may impede harvesting of the plant or a plant product.

Other conventional methods of providing support to plants may include building custom support structures based upon the needs of the individual plant. However, assembling these structures may be cumbersome, as assemblies for attaching multiple supports with one another may be complicated and difficult to erect about a growing plant.

III. DISCLOSURE OF THE INVENTION

A broad object of a particular embodiment of the invention can be to provide a coupler including an annular body having an annular body outer surface and an annular body inner surface connecting opposed annular body first and second faces, the annular body inner surface bounding an internal opening communicating between the opposed annular body first and second faces; the annular body having opposed annular body first and second ends which connect the annular body outer and inner surfaces and the annular body first and second faces to define a radial slot which communicates with the internal opening; the annular body sufficiently resiliently flexible to provide an adjustable radial slot width of the radial slot; and a plurality of spaced apart teeth radially inwardly projecting from the annular body inner surface.

Another broad object of a particular embodiment of the invention can be to provide a method of producing a coupler, the method including providing an annular body having an annular body outer surface and an annular body inner surface connecting opposed annular body first and second faces, the annular body inner surface bounding an internal opening communicating between the opposed annular body first and second faces; connecting the annular body outer and inner surfaces and the annular body first and second faces with opposed annular body first and second ends to define a radial slot which communicates with the internal opening; configuring the annular body as sufficiently resiliently flexible to provide an adjustable radial slot width of the radial slot; and radially inwardly projecting a plurality of spaced apart teeth from the annular body inner surface.

Another broad object of a particular embodiment of the invention can be to provide a method of using a coupler, the method including obtaining the coupler including an annular body having an annular body outer surface and an annular body inner surface connecting opposed annular body first and second faces, the annular body inner surface bounding an internal opening communicating between the opposed annular body first and second faces; the annular body having opposed annular body first and second ends which connect the annular body outer and inner surfaces and the annular body first and second faces to define a radial slot which communicates with the internal opening; the annular body sufficiently resiliently flexible to provide an adjustable radial slot width of the radial slot; and a plurality of spaced apart teeth radially inwardly projecting from the annular body inner surface; and removably coupling the coupler with a support.

Another broad object of a particular embodiment of the invention can be to provide a method of using a coupler, the method including obtaining a first coupler further comprising a female connector having a female connector interior cavity; obtaining a second coupler further comprising a male connector having a male connector protruding portion configured to removably matably engage within the female connector interior cavity; and removably matably engaging the male connector protruding portion within the female connector interior cavity to couple the first and second couplers.

Another broad object of a particular embodiment of the invention can be to provide a method of using a coupler, the method including obtaining a first coupler further comprising a female connector having a female connector interior cavity; obtaining a second coupler further comprising a hook element having a pair of opposed elongate recesses, each extending across one of two opposing hook element faces proximate a hook element tip, wherein the hook element tip is configured to removably matably engage within the female connector interior cavity; and removably matably engaging the hook element tip within the female connector interior cavity to couple the first and second couplers.

Another broad object of a particular embodiment of the invention can be to provide a method of using a coupler, the method including obtaining a first coupler further comprising a first coupler resiliently deformable hook element outwardly extending from the annular body outer surface of the first coupler; obtaining a second coupler further comprising a second coupler resiliently deformable hook element outwardly extending from the annular body outer surface of the second coupler; and resiliently deforming the first and second resiliently deformable hook elements to engage a first coupler resiliently deformable hook element hook portion with a second coupler resiliently deformable hook element hook portion to couple the first and second couplers.

Naturally, further objects of the invention are disclosed throughout other areas of the specification, drawings, and claims.

IV. BRIEF DESCRIPTION OF THE DRAWINGS

FIG. 5 is a first face view of a particular embodiment of a coupler.

FIG. 6 is a second face view of a particular embodiment of a coupler.

FIG. 11A is an illustration of a method of using a particular embodiment of a coupler.

FIG. 11B is an illustration of a method of using a particular embodiment of a coupler.

V. MODE(S) FOR CARRYING OUT THE INVENTION

Figure 1:
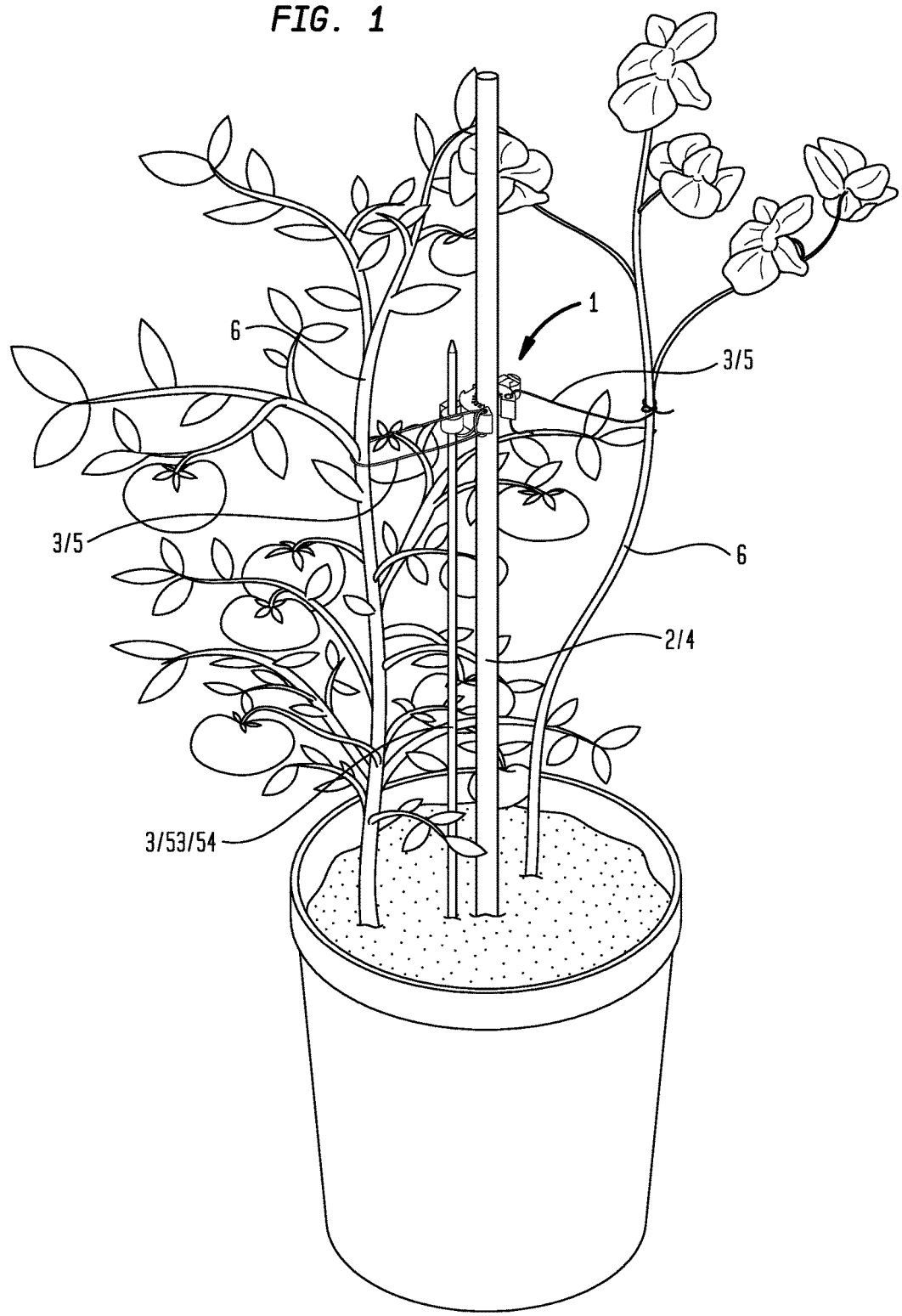
FIG. 1 is an illustration of a method of using a particular embodiment of a coupler.

Now referring primarily to FIG. 1, which illustrates a method of using a particular embodiment of a radially slotted annular coupling system including a coupler (1). A user can removably couple the coupler (1) to a support (2) or a supportive element (3). As an illustrative example, a user can removably couple the coupler (1) to a support (2) in the form of a stake (4) and a supportive element (3) in the form of a tether (5), whereby the tether (5) removably coupled to the stake (4) by the coupler (1) can provide support to a plant (6).

Figure 2:
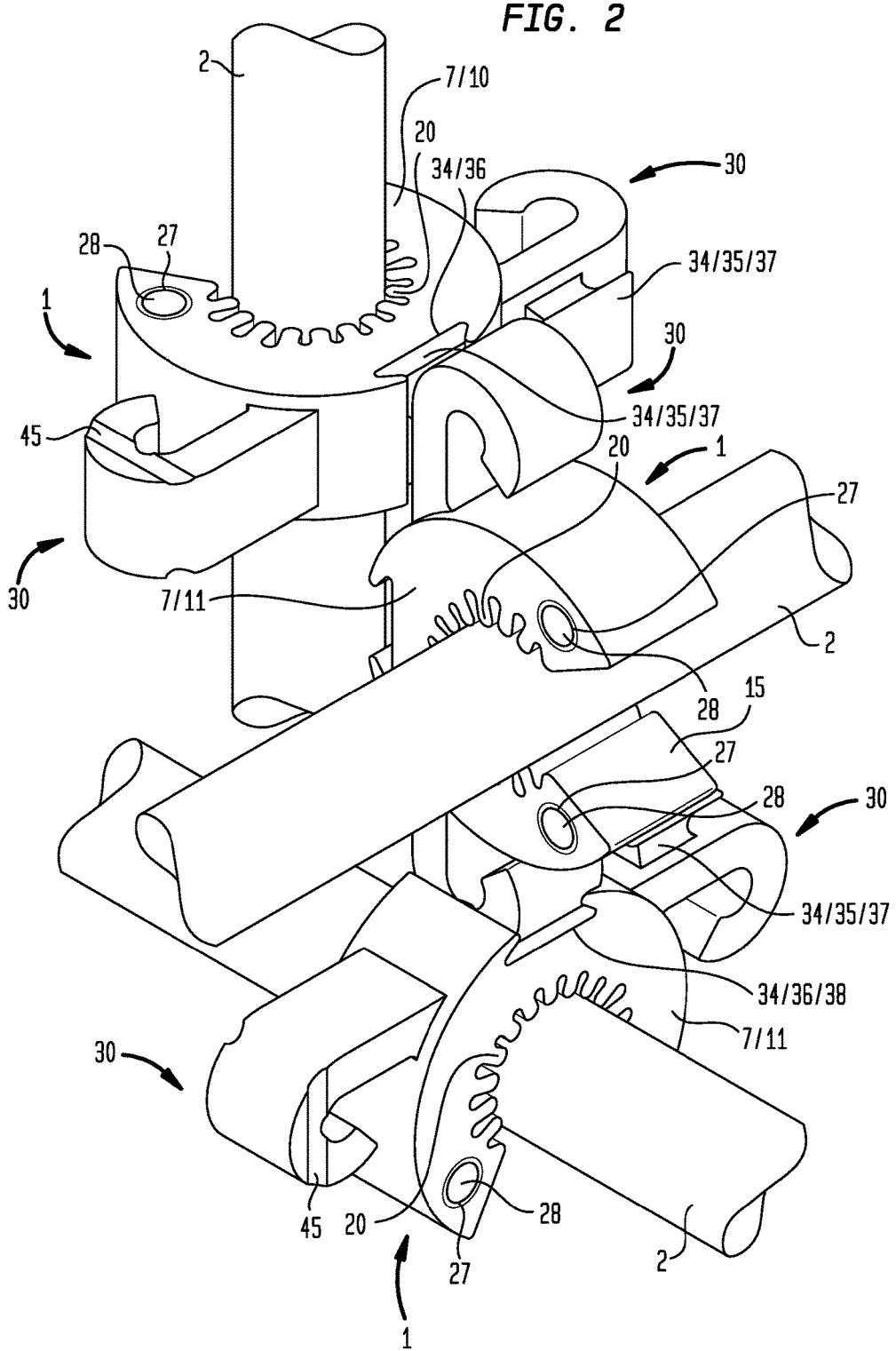
FIG. 2 is an illustration of a method of using a particular embodiment of a coupler.

Now referring primarily to FIG. 2, which illustrates another method of using a particular embodiment of a radially slotted annular coupling system including a plurality of couplers (1), which a user can removably couple to one another in addition to removably coupling each coupler (1) to a support (2).

Now referring primarily to FIG. 3A through FIG. 10, the coupler (1) includes an annular body (7) having an annular body outer surface (8) and an annular body inner surface (9) connecting opposed annular body first and second faces (10)(11).

As to particular embodiments, the annular body outer and inner surfaces (8)(9) can be arcuate; however, this is not intended to be limiting with respect to other embodiments of the annular body outer and inner surfaces (8)(9), which can be linear, arcuate, undulating, or combinations thereof, depending upon the application. As to particular embodiments, the annular body outer surface (8) can be contoured to extend in generally adjacent parallel relation to the annular body inner surface (9). For example, an arcuate annular body outer surface (8) can be contoured to extend in generally adjacent parallel relation to an arcuate annular body inner surface (9).

As to particular embodiments, the annular body first and second faces (10)(11) can be substantially planar; however, this is not intended to be limiting with respect to other embodiments of the annular body first and second faces (10)(11), which can be planar, arcuate, undulating, or combinations thereof, depending upon the application. As to particular embodiments, the annular body first face (10) can be contoured to extend in generally adjacent parallel relation to the annular body second face (11). For example, a substantially planar annular body first face (10) can be contoured to extend in generally adjacent parallel relation to a substantially planar annular body second face (11).

Figure 7:
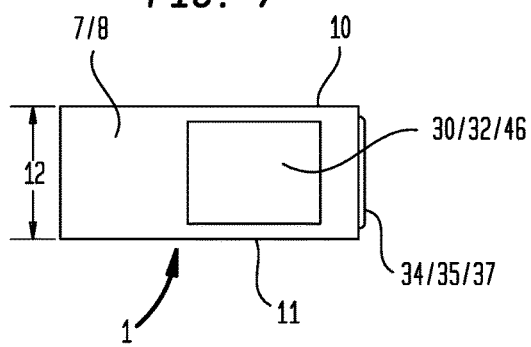
FIG. 7 is a top view of a particular embodiment of a coupler.
Figure 8:
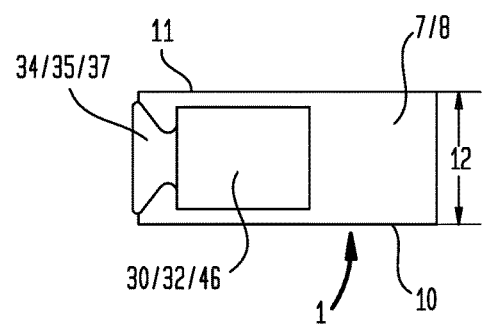
FIG. 8 is a bottom view of a particular embodiment of a coupler.
Figure 9:
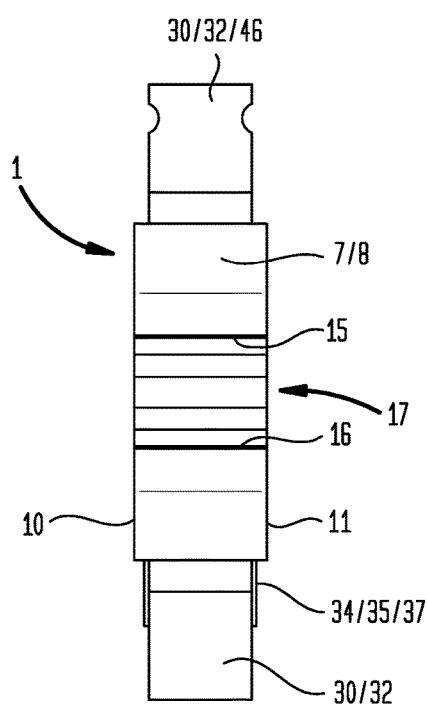
FIG. 9 is a first side view of a particular embodiment of a coupler.

Now referring primarily to FIG. 7 and FIG. 8, the annular body (7) can further include an annular body thickness (12) disposed between the annular body first and second faces (10)(11). As to particular embodiments, the annular body thickness (12) can be greater than about 2 millimeters. As to particular embodiments, the annular body thickness (12) can be selected from the group including or consisting of: greater than about 2 millimeters; greater than about 2.5 millimeters; greater than about 3 millimeters; greater than about 3.5 millimeters; greater than about 4 millimeters; greater than about 4.5 millimeters; greater than about 5 millimeters; greater than about 5.5 millimeters; greater than about 6 millimeters; greater than about 6.5 millimeters; greater than about 7 millimeters; greater than about 7.5 millimeters;

greater than about 8 millimeters; greater than about 8.5 millimeters; greater than about 9 millimeters; greater than about 9.5 millimeters; and greater than about 10 millimeters.

Now referring primarily to FIG. 3A through FIG. 10, the annular body inner surface (9) can bound an internal opening (13) communicating between the opposed annular body first and second faces (10)(11). As to particular embodiments, the internal opening (13) can have an internal opening cross section defining numerous configurations of varying dimensions, including or consisting of: a circle, an oval, an ellipse, a triangle, a square, a rectangle, a polygon, or the like, or combinations thereof; which can insertingly receive and removably retain a support (2) having correspondingly numerous configurations of varying dimensions. As an illustrative example, an arcuate annular body inner surface (9) can define an internal opening (13) having a generally elliptical internal opening cross section, which can insertingly receive and removably retain a support (2), for example a stake (4) having a generally circular stake cross section.

Again referring primarily to FIG. 3A through FIG. 10, the annular body (7) further includes opposed annular body first and second ends (15)(16) which connect the annular body outer and inner surfaces (8)(9) and the annular body first and second faces (10)(11) to define a radial slot (17) which communicates with the internal opening (13), whereby the annular body (7) can be sufficiently resiliently flexible to provide an adjustable radial slot width (18) of the radial slot (17). As an illustrative example, the annular body (7) can be resiliently flexed to provide a radial slot (17) having a greater adjustable radial slot width (18) to facilitate the insertion of a support (2) having a greater support cross section into the internal opening (13) communicating with the radial slot (17).

Again referring primarily to FIG. 3A through FIG. 10, as to particular embodiments, the opposed annular body first and second ends (15)(16) which define the radial slot (17) can be disposed in angled relation to one another. As to particular embodiments, the angled relation of the opposed annular body first and second ends (15)(16) can be defined by an angle (19) in a range of between about 20 degrees to about 120 degrees. As to particular embodiments, the angle (19) can be in a range selected from the group including or consisting of: between about 20 degrees to about 120 degrees; between about 30 degrees to about 110 degrees; between about 40 degrees to about 100 degrees; between about 50 degrees to about 90 degrees; and between about 60 degrees to about 80 degrees. As an illustrative example, the opposed body first and second ends (15)(16) can be disposed in angled relation to one another, whereby the angled relation is defined by an angle (19) of about 60 degrees (as shown in the Figures).

Again referring primarily to FIG. 3A through FIG. 10, the annular body (7) further includes a plurality of spaced apart teeth (20) radially inwardly projecting from the annular body inner surface (9). A tooth (20) of the plurality of spaced apart teeth (20) can include a tooth length disposed between tooth first and second ends (21)(22) and a tooth width disposed between tooth first and second sides (23)(24). As to particular embodiments, each of the plurality of teeth (20) can have uniform tooth lengths or tooth widths, or the tooth length or tooth width can vary among the plurality of teeth (20).

As an illustrative example, the annular body inner surface (9) can include thirteen spaced apart teeth (20) radially inwardly projecting from the annular body inner surface (9), the teeth (20) having uniform tooth widths and variable tooth lengths, whereby the six teeth (20) disposed proximate the radial slot (17) can have greater tooth lengths and the seven teeth (20) disposed distal from the radial slot (17) can have lesser tooth lengths. In this particular embodiment, the variable tooth lengths can facilitate the retention of a support (2) received within the internal opening (13) bounded by the annular body inner surface (9) and preclude movement of the coupler (1) about the support (2).

Again referring primarily to FIG. 3A through FIG. 10, the plurality of spaced apart teeth (20) can be configured such that the annular body inner surface (9) can define a plurality of peaks (25) and valleys (26), which can be substantially planar, arcuate, or combinations thereof. As an illustrative example, the annular body inner surface (9) can include thirteen spaced apart teeth (20) radially inwardly projecting from the annular body inner surface (9), the teeth (20) configured such that the annular body inner surface (9) defines thirteen arcuate peaks (25) and fourteen arcuate valleys (26).

Figure 3A:
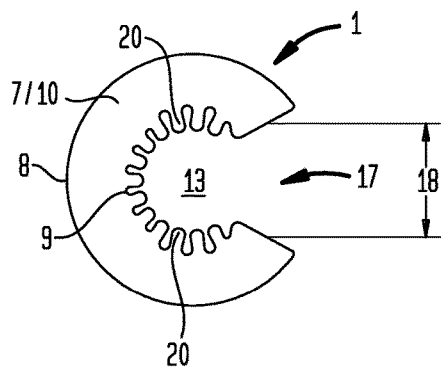
FIG. 3A is a view of a particular embodiment of a coupler.
Figure 3B:
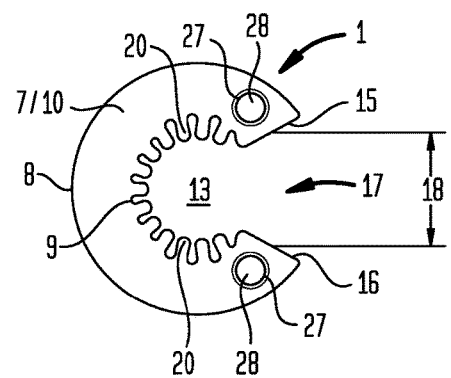
FIG. 3B is a view of a particular embodiment of a coupler including a pair of aperture elements bounding a corresponding pair of aperture element openings.
Figure 10:
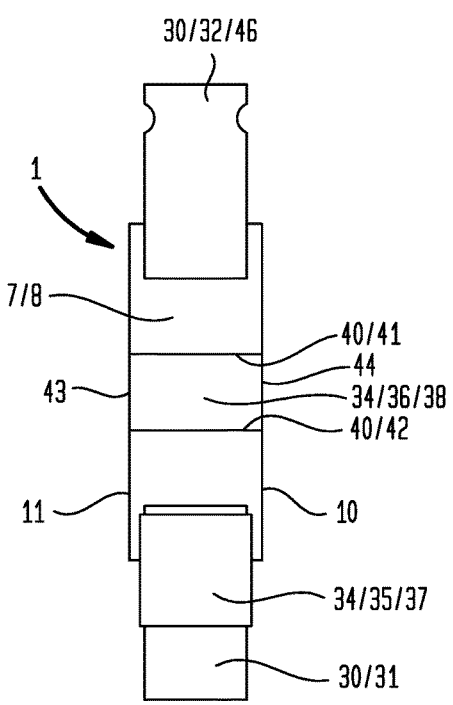
FIG. 10 is a second side view of a particular embodiment of a coupler.

Now referring primarily to FIG. 3B though FIG. 10, the annular body (7) can further include one or more aperture elements (27) bounding one or more aperture element openings (28), which can be disposed, for example, in the annular body first face (10) or the annular body second face (11). As to particular embodiments, the aperture element (27) can be a closed end aperture element, communicating with the annular body first face (10) or the annular body second face (11). As to other particular embodiments, the aperture element (27) can be an open end aperture element, communicating between the annular body first and second faces (10)(11).

As to particular embodiments, the aperture element opening (28) can have an aperture element opening cross section defining numerous configurations of varying dimensions, including or consisting of: a circle, an oval, an ellipse, a triangle, a square, a rectangle, a polygon, or the like, or combinations thereof; which can insertingly receive and removably retain a support (2) having correspondingly numerous configurations of varying dimensions.

As an illustrative example, an aperture element (27) can bound an aperture element opening (28) having a generally circular aperture element opening cross section, which can insertingly receive and removably retain a supportive element (3), for example a tether (5) having a generally circular tether cross section.

Again referring primarily to FIG. 3B though FIG. 10, the aperture element (27) can be disposed in numerous and varied locations about the annular body (7) to position a supportive element (3) received within the aperture element opening (28) in a desired location, for example a desired location from which the supportive element (3) can provide support to a plant (6). As an illustrative example, the annular body (7) can include a pair of open end aperture elements (27) communicating between the annular body first and second body faces (10)(11), each disposed proximate one of the opposed annular body first and second ends (15)(16).

Figure 3C:
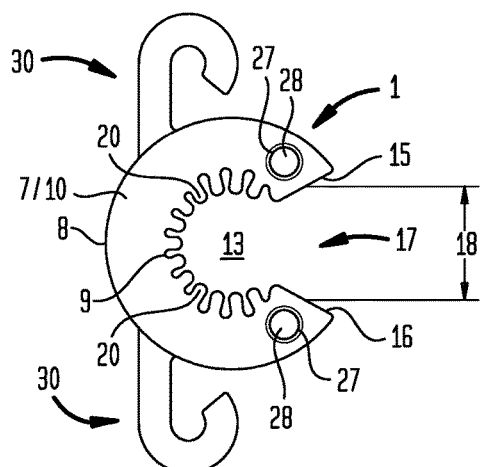
FIG. 3C is a view of a particular embodiment of a coupler including a pair of aperture elements bounding a corresponding pair of aperture element openings and a pair of hook elements.
Figure 3D:
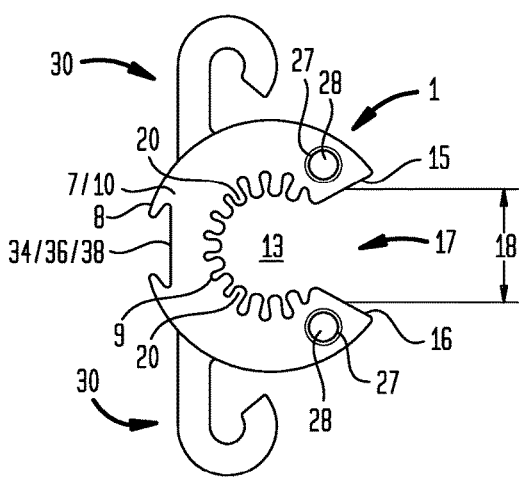
FIG. 3D is a view of a particular embodiment of a coupler including a pair of aperture elements bounding a corresponding pair of aperture element openings, a pair of hook elements, and a female connector having a female connector interior cavity.
Figure 3E:
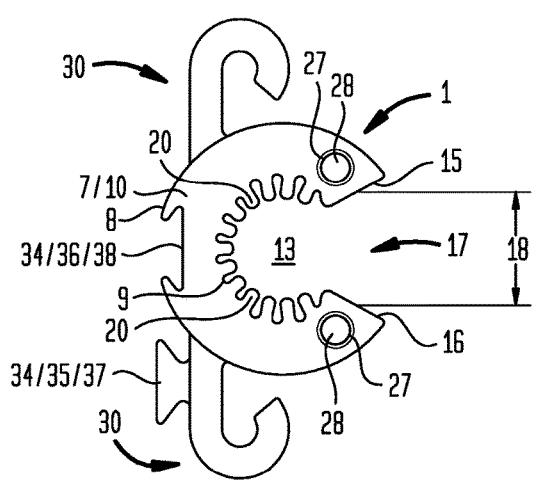
FIG. 3E is a view of a particular embodiment of a coupler including a pair of aperture elements bounding a corresponding pair of aperture element openings, a pair of hook elements, a female connector having a female connector interior cavity, and a male connector having a male connector protruding portion.
Figure 4:
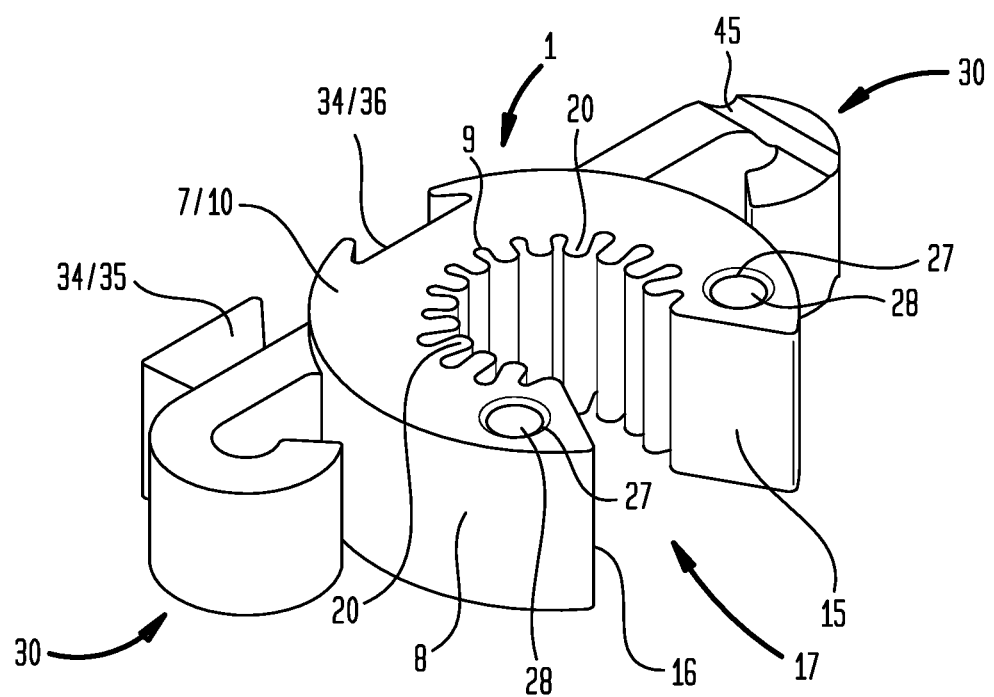
FIG. 4 is a perspective view of a particular embodiment of a coupler.

Now referring primarily to FIG. 3C though FIG. 10, the coupler (1) can further include one or more hook elements (30) outwardly extending from the annular body outer surface (8). A hook element (30) can include a shank portion (31) connected to a hook portion (32). As to particular embodiments, the shank portion (31) can be coupled to the annular body outer surface (8) in numerous and varied locations along the annular body outer surface (8). As an illustrative example, the shank portion (31) can be coupled to the annular body outer surface (8) distal from the radial slot (17).

Again referring primarily to FIG. 3C though FIG. 10, the hook portion (32) can have a lesser or greater curvature, depending upon the application. The hook portion (32) can outwardly extend from the annular body outer surface (8) such that the hook portion (32) can be disposed toward or away from the radial slot (17). As to particular embodiments, a hook portion end (33) can be in angled relation to the shank portion (31). As an illustrative example, the hook portion end (33) can be in an angled relation of about 125 degrees with the shank portion (31); however, the invention need not be so limited, as the hook portion end (33) can be in any angled relation with the shank portion (31).

As an illustrative example, the coupler (1) can include a pair of hook elements (30) outwardly extending from the annular body outer surface (8) opposite one another. As to particular embodiments, the shark portions (31) of each hook element (30) can be disposed in substantially parallel relation to one another and the hook portions (32) of each hook element (30) can be disposed toward the radial slot (17).

Now referring primarily to FIG. 3D through FIG. 10, the coupler (1) can further include one or more matably engagable connecting elements (34), which can include a male connector (35) or a female connector (36). The male connector (35) can have a male connector protruding portion (37) and the female connector (36) can have a female connector interior cavity (38), whereby the male connector protruding portion (37) can be removably matably engaged within the female connector interior cavity (38).

As to particular embodiments, the male connector protruding portion (37) or the female connector interior cavity (38) can include numerous configurations of varying dimensions which can removably matably engage with one another, thereby securely coupling a pair of couplers (1) including the matably engagable connecting elements (34) to one another. As an illustrative example, the male connector protruding portion (37) can be configured as a truncated four-faced pyramid (39) and the corresponding female connector interior cavity (38) can be defined by a truncated four-faced pyramid (39) bounded by face shoulders (40) on each of two opposing female connector interior cavity faces (41)(42) (as shown in the example of FIG. 6). For releasable matable engagement, the male connector protruding portion (37) can be removably matably engaged within the female connector interior cavity (38) by sliding any of the four faces of the truncated four-faced pyramid (39) of the male connector protruding portion (37) into either of the two opposing female connector interior cavity faces (43)(44) of the corresponding female connector interior cavity (38) which are void of face shoulders (40) (as shown in the examples of FIG. 11A through FIG. 12C).

Figure 13:
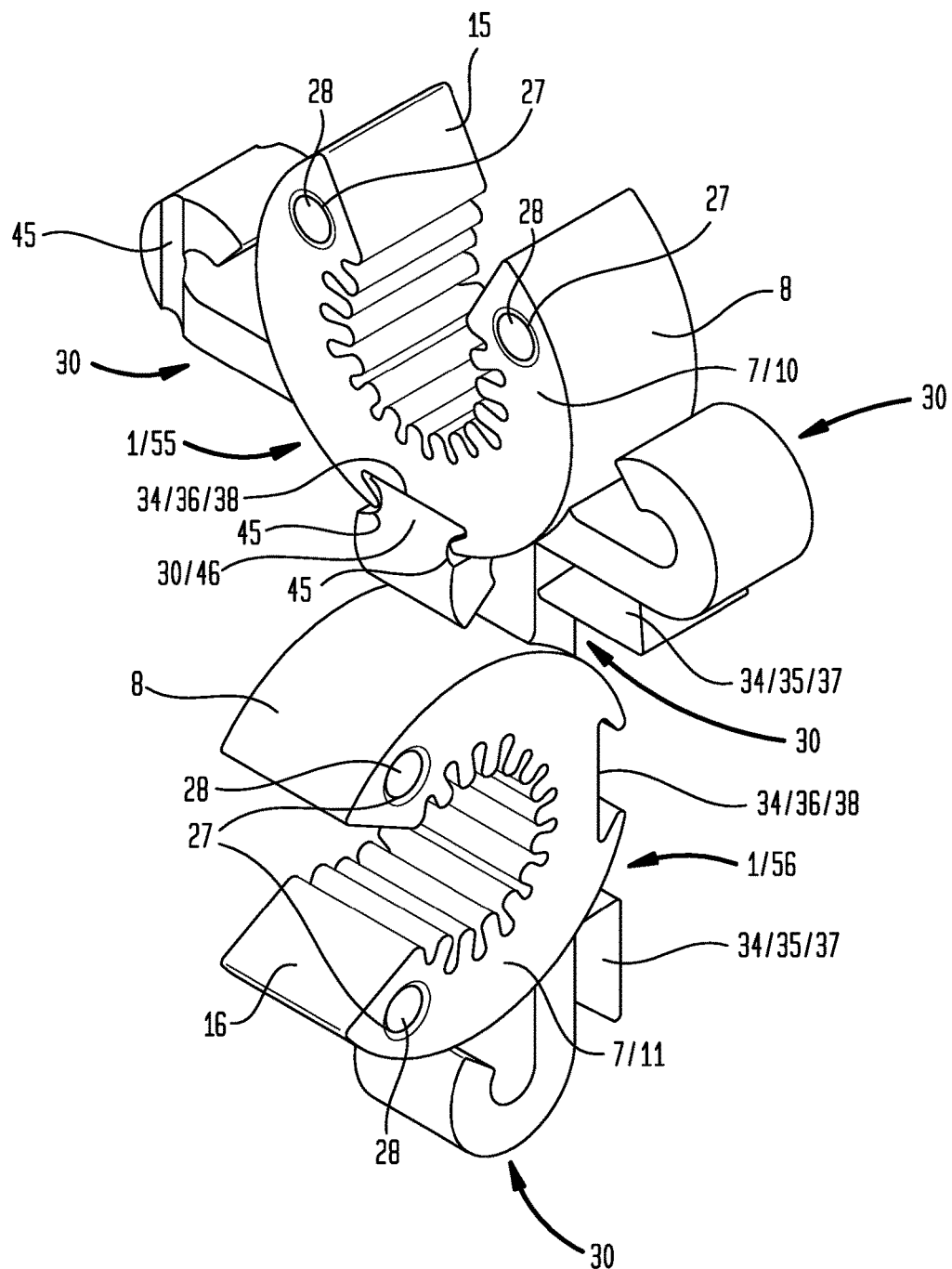
FIG. 13 is an illustration of a method of using a particular embodiment of a coupler.

Now referring primarily to FIG. 4 through FIG. 10 and FIG. 13, in addition to removably matably engaging with the male connector (35), the female connector (36) can also removably matably engage with a hook element (30) including a pair of opposed elongate recesses (45) disposed proximate a hook element tip (46). The first elongate recess (47) can extend across a hook element first face (48) proximate the hook element tip (46) and the second elongate recess (49) can extend across a hook element second face (50) proximate the hook element tip (46) (as shown in the examples of FIG. 5 and FIG. 6). For releasable matable engagement, the hook element tip (46) can be removably matably engaged within the female connector interior cavity (38) by sliding the hook element tip (46) into either of the two opposing female connector interior cavity faces (43)(44) of the corresponding female connector interior cavity (38) which are void of face shoulders (40) (as shown in the example of FIG. 13).

As to particular embodiments, one or more male connectors (35) can be coupled to the coupler (1) in various locations, including along the annular body outer surface (8), along the hook element (30), or combinations thereof. As to particular embodiments, the coupler (1) can include a male connector (35) coupled to a first hook element (51) and a pair of opposed elongate recesses (45) can be disposed in an opposed second hook element (52) (as shown in the examples of FIG. 5 and FIG. 6).

As to particular embodiments, one or more female connectors (36) can be coupled to the coupler (1) in various locations, including along the annular body outer surface (8), along the hook element (30), or combinations thereof. As such, one or more female connector interior cavities (38) can be bounded by the corresponding annular body outer surface (8), the hook element (30), or combinations thereof.

As to particular embodiments, the coupler (1) can include a male connector (35) and a female connector (36). As an illustrative example, the male connector protruding portion (37) can outwardly extend from the shank portion (31) of the hook element (30), and the female connector interior cavity (38) can be bounded by the annular body outer surface (8) opposite the radial slot (17).

A method of producing the coupler (1) can include providing an annular body (7) having an annular body outer surface (8) and an annular body inner surface (9) connecting opposed annular body first and second faces (10)(11), whereby the annular body inner surface (9) bounds an internal opening (13) communicating between the opposed annular body first and second faces (10)(11); connecting the annular body outer and inner surfaces (8)(9) and the annular body first and second faces (10)(11) with opposed annular body first and second ends (15)(16) to define a radial slot (17) which communicates with the internal opening (13); configuring the annular body (7) as sufficiently resiliently flexible to provide an adjustable radial slot width (18) of the radial slot (17); and radially inwardly projecting a plurality of spaced apart teeth (20) from the annular body inner surface (9).

As to particular embodiments, the method of producing the coupler (1) can further include configuring the annular body inner and outer surfaces (8)(9) as generally arcuate.

As to particular embodiments, the method of producing the coupler (1) can further include disposing an annular body thickness (12) between the annular body first and second faces (10)(11), whereby the annular body thickness (12) can be in a range of between about 2 millimeters to about 20 millimeters. As to particular embodiments, the annular body thickness (12) can be selected from the group including or consisting of: between about 2 millimeters to about 20 millimeters; between about 2.5 millimeters to about 20 millimeters; between about 3 millimeters to about 20 millimeters; between about 3.5 millimeters to about 20 millimeters; between about 4 millimeters to about 20 millimeters; between about 4.5 millimeters to about 20 millimeters; and between about 5 millimeters to about 20 millimeters.

As to particular embodiments, the method of producing the coupler (1) can further include configuring the internal opening (13) to have a generally elliptical internal opening cross section.

As to particular embodiments, the method of producing the coupler (1) can further include disposing the opposed annular body first and second ends (15)(16) which define the radial slot (17) in angled relation to one another. As to particular embodiments, the angled relation can be defined by an angle (19) in a range of between about 20 degrees to about 120 degrees. As to particular embodiments, the angle (19) can be in a range selected from the group including or consisting of: between about 20 degrees to about 120 degrees; between about 30 degrees to about 110 degrees;

between about 40 degrees to about 100 degrees; between about 50 degrees to about 90 degrees; and between about 60 degrees to about 80 degrees.

As to particular embodiments, the method of producing the coupler (1) can further include disposing an aperture element (27) within the annular body (7), the aperture element (27) bounding an aperture element opening (28) communicating between the annular body first and second faces (10)(11). As to particular embodiments, the method of producing the coupler (1) can further include disposing a pair of aperture elements (27) within the annular body (7), each disposed proximate one of the opposed annular body first and second ends (15)(16).

As to particular embodiments, the method of producing the coupler (1) can further include outwardly extending a hook element (30) from the annular body outer surface (8). As to particular embodiments, the method of producing the coupler (1) can further include outwardly extending a pair of hook elements (30) from the annular body outer surface (8) opposite one another.

As to particular embodiments, the method of producing the coupler (1) can further include coupling a matably engagable connecting element (34) to the coupler (1). As to particular embodiments, the method of producing the coupler (1) can further include configuring the matably engagable connecting element (34) as a female connector (36) having a female connector interior cavity (38). As to particular embodiments, the method of producing the coupler (1) can further include configuring the matably engagable connecting element (34) as a male connector (35) having a male connector protruding portion (37) configured to removably matably engage within a female connector interior cavity (38) of a female connector (36).

As to particular embodiments, the method of producing the coupler (1) can further include coupling a pair of matably engagable connecting elements (34) to the coupler (1), the pair of matably engagable connecting elements (34) configured as a female connector (36) having a female connector interior cavity (38) and a male connector (35) having a male connector protruding portion (37). As to particular embodiments, the method of producing the coupler (1) can further include coupling the male connector (35) to a hook element (30). As to particular embodiments, the method of producing the coupler (1) can further include disposing the female connector interior cavity (38) within the annular body outer surface (8) opposite the radial slot (17).

As to particular embodiments, the method of producing the coupler (1) can further include disposing a pair of opposed elongate recesses (45) within the hook element (30), each elongate recess (45) extending across one of two opposing hook element faces (48)(50) proximate a hook element tip (46). As to particular embodiments, the method of producing the coupler (1) can further include configuring the hook element tip (46) to removably matably engage within a female connector interior cavity (38) of a female connector (36).

As to particular embodiments, elements of the coupler (1) can be entirely formed of the same material, or alternatively, various elements of the coupler (1) can be formed from different materials. As to particular embodiments, elements of the coupler (1) can be produced from any of a wide variety of materials which can sufficiently resiliently flex to provide an adjustable radial slot width (18) of the radial slot (17), including resiliently deformable materials, resiliently flexible materials, or the like, or combinations thereof. By way of non-limiting example, the material can include or consist of: metal, wood, rubber, rubber-like material, plastic, plastic-like material, acrylic, polyamide, polyester, polypropylene, polyvinyl chloride-based materials, silicone-based materials, or the like, or combinations thereof As to particular embodiments, the coupler (1) or elements of the coupler (1) can be produced from any of a wide variety of processes depending upon the application, such as press molding, injection molding, fabrication, machining, printing, three-dimensional printing, or the like, or combinations thereof, as one piece or assembled from a plurality of pieces into an embodiment of the coupler (1) or provided as a plurality of pieces for assembly into an embodiment of the coupler (1).

A method of using the coupler (1) can include obtaining a coupler (1) including an annular body (7) having an annular body outer surface (8) and an annular body inner surface (9) connecting opposed annular body first and second faces (10)(11), the annular body inner surface (9) bounding an internal opening (13) communicating between the opposed annular body first and second faces (10)(11), the annular body (7) having opposed annular body first and second ends (15)(16) which connect the annular body outer and inner surfaces (8)(9) and the annular body first and second faces (10)(11) to define a radial slot (17) which communicates with the internal opening (13), the annular body (7) sufficiently resiliently flexible to provide an adjustable radial slot width (18) of the radial slot (17), and a plurality of spaced apart teeth (20) radially inwardly projecting from the annular body inner surface (9); and removably coupling the coupler (1) with a support (2).

By way of non-limiting example, a support (2) can be configured as a rod, tube, post, stake, cage, trellis, dowel, tie, cord, cable, or the like, or combinations thereof.

As to particular embodiments, the method of using the coupler (1) can further include forcibly resiliently flexing the annular body (7) to provide a greater radial slot width (18) of the radial slot (17) and inserting the support (2) through the radial slot (17) having the greater adjustable radial slot width (18) and into the internal opening (13). Subsequently, the annular body (7) can resiliently flex to decrease the adjustable radial slot width (18) of the radial slot (17) such that the internal opening (13) can removably retain the support (2), as the annular body inner surface (9) bounding the internal opening (13) can resiliently deform about the support (2) inserted into the internal opening (13). As to particular embodiments, the method of using the coupler (1) can further include frictionally engaging the support (2) with the plurality of spaced apart teeth (20) radially inwardly projecting from the annular body inner surface (9) to removably retain the support (2) within the internal opening (13). As to particular embodiments, the plurality of spaced apart teeth (20) can preclude the coupler (1) from rotating about a coupled support (2) or moving longitudinally along a coupled support (2).

As to particular embodiments, the method of using the coupler (1) can further include obtaining a coupler (1) further including an aperture element (27) bounding an aperture element opening (28) communicating between the annular body first and second faces (10)(11); and inserting a supportive element (3) into the aperture element opening (28). As to particular embodiments, the coupler (1) can removably couple the supportive element (3) insertingly received within the aperture element opening (28) to a support (2) insertingly received within the internal opening (13).

By way of non-limiting example, a supportive element (3) can be configured as a tether, string, twine, twist tie, wire, gardening wire, vinyl plant tie, clip, plant yo-yo, trellis netting, skewer, bamboo skewer, zip tie, stake, marker, tool, cord, cable, or the like, or combinations thereof.

As an illustrative example, a user can insert a supportive element (3) configured as a tether (5) through the aperture element opening (28) and removably secure the tether (5) within the aperture element opening (28). As such, the tether (5) can be removably coupled to a support (2) insertingly received within the internal opening (13) of the coupler (1). As to particular embodiments, the tether (5) can be used to provide support to a portion of a plant (6) disposed proximate the tether (5) (as shown in the example of FIG. 1).

As to particular embodiments, the method of using the coupler (1) can further include obtaining a coupler (1) further including a hook element (30) outwardly extending from the annular body outer surface (8); and inserting a supportive element (3), as described above, into a hook portion (32) of the hook element (30).

As an illustrative example, a user can insert a supportive element (3) configured as a tether (5) through a hook portion (32) of the hook element (30) and removably secure the tether (5) within the hook portion (32). As such, the tether (5) can be removably coupled to a support (2) insertingly received within the internal opening (13) of the coupler (1). As to particular embodiments, the tether (5) can be used to provide support to a portion of a plant (6) disposed proximate the tether (5) (as shown in the example of FIG. 1).

As another illustrative example, a user can insert a supportive element (3) configured as a rod (53), for example a bamboo skewer (54), through a hook portion (32) of the hook element (30) and removably secure the rod (53) within the hook portion (32). As such, the rod (53) can be removably coupled to a support (2) insertingly received within the internal opening (13) of the coupler (1). As to particular embodiments, the rod (53) can be used to provide support to a portion of a plant (6) disposed proximate the rod (53) (as shown in the example of FIG. 1).

Now referring primarily to FIG. 11A through FIG. 12C, as to particular embodiments, a method of using the coupler (1) can include obtaining a first coupler (55) further comprising a female connector (36) having a female connector interior cavity (38); obtaining a second coupler (56) further comprising a male connector (35) having a male connector protruding portion (37) configured to removably matably engage within the female connector interior cavity (38); and removably matably engaging the male connector protruding portion (37) within the female connector interior cavity (38).

As an illustrative example, a user can removably matably engage a male connector protruding portion (37) outwardly extending from a shank portion (31) of a hook element (30) coupled to the second coupler (56) with a female connector interior cavity (38) bounded by the annular body outer surface (8) of the first coupler (55), thereby coupling the first and second couplers (55)(56).

As to particular embodiments, the first and second couplers (55)(56) can be coupled such that the corresponding internal openings (13) dispose in planar relation with one another (as shown in the examples of FIG. 11A and FIG. 11B).

Figure 12A:
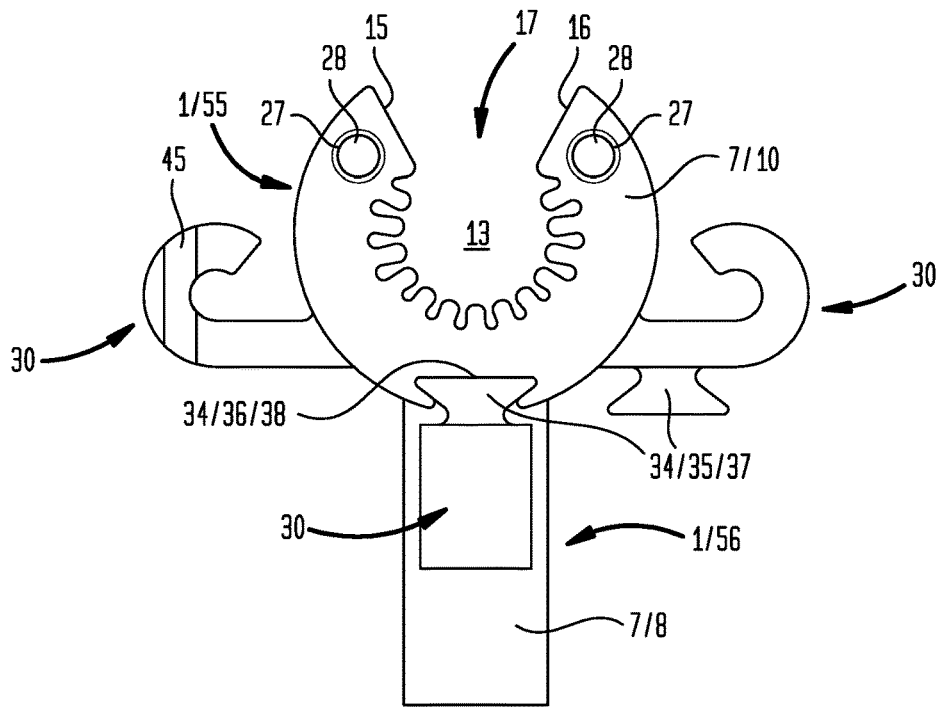
FIG. 12A is an illustration of a method of using a particular embodiment of a coupler.
Figure 12B:
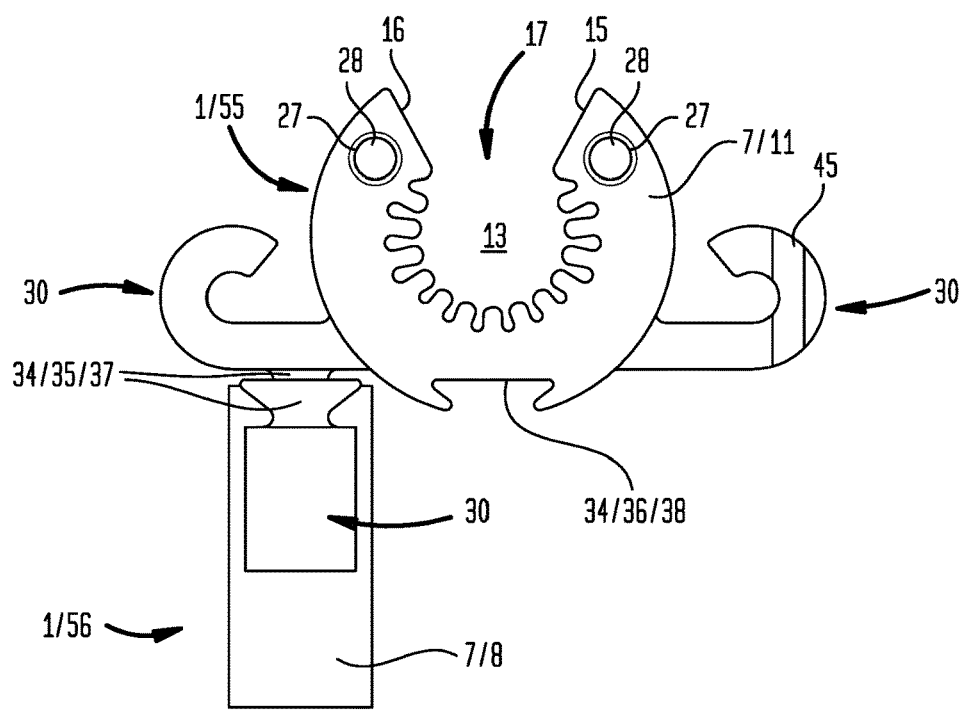
FIG. 12B is an illustration of a method of using a particular embodiment of a coupler.
Figure 12C:
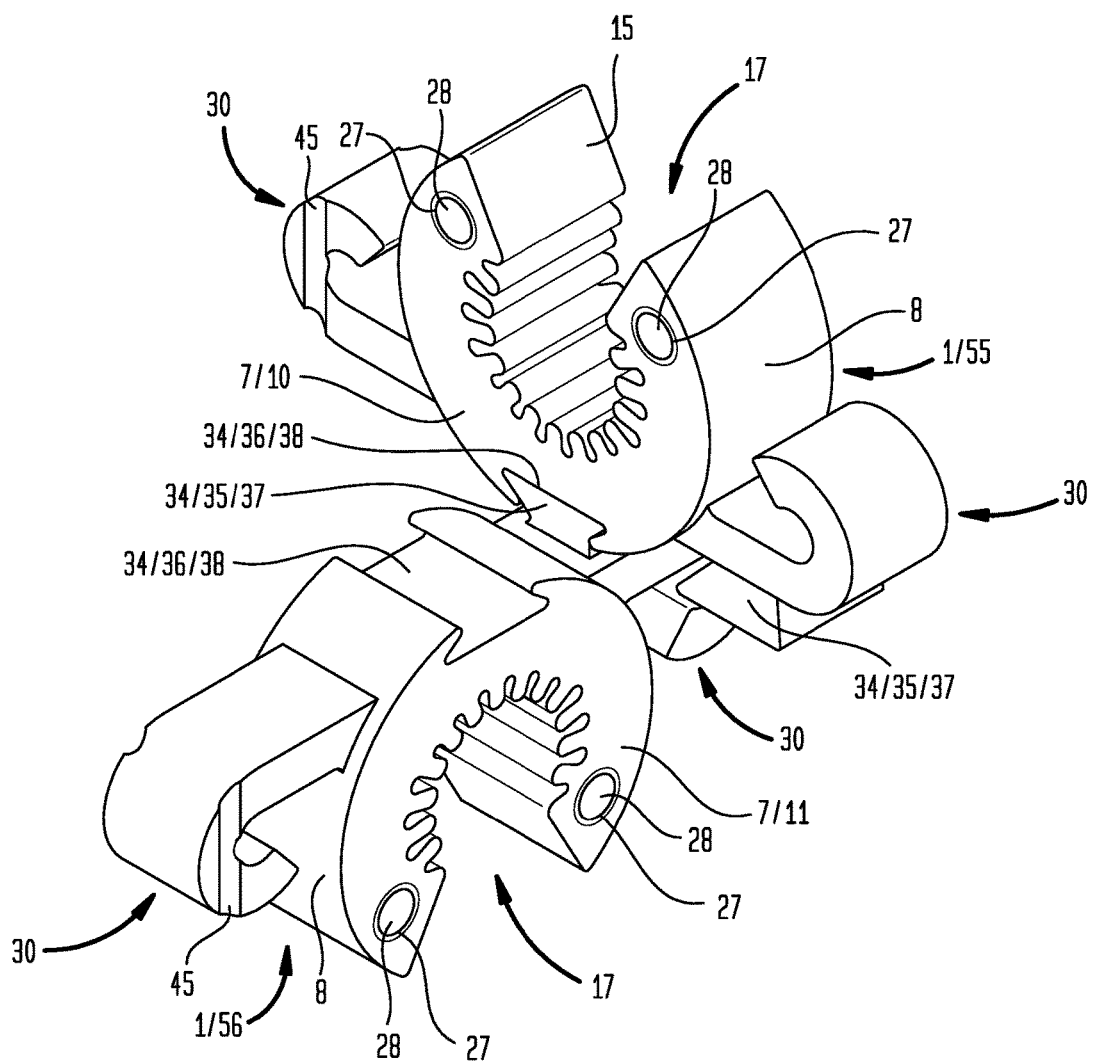
FIG. 12C is an illustration of a method of using a particular embodiment of a coupler.

As to other particular embodiments, the first and second couplers (55)(56) can be coupled such the corresponding internal openings (13) dispose in orthogonal relation with one another (as shown in the examples of FIG. 12A through FIG. 12C).

Now referring primarily to FIG. 13, as to particular embodiments, a method of using the coupler (1) can include obtaining a first coupler (55) further including a female connector (36) having a female connector interior cavity (38); obtaining a second coupler (56) further including a hook element (30) having a pair of opposed elongate recesses (45), each extending across one of two opposing hook element faces (48)(50) proximate a hook element tip (46), whereby the hook element tip (46) can be configured to removably matably engage within the female connector interior cavity (38); and removably matably engaging the hook element tip (46) within the female connector interior cavity (38) to couple the first and second couplers (55)(56).

As to particular embodiments, the first and second couplers (55)(56) can be coupled such that the corresponding internal openings (13) dispose in planar relation with one another (as shown in the example of FIG. 13).

As to other particular embodiments, the first and second couplers (55)(56) can be coupled such that the corresponding internal openings (13) dispose in orthogonal relation with one another.

Figure 14A:
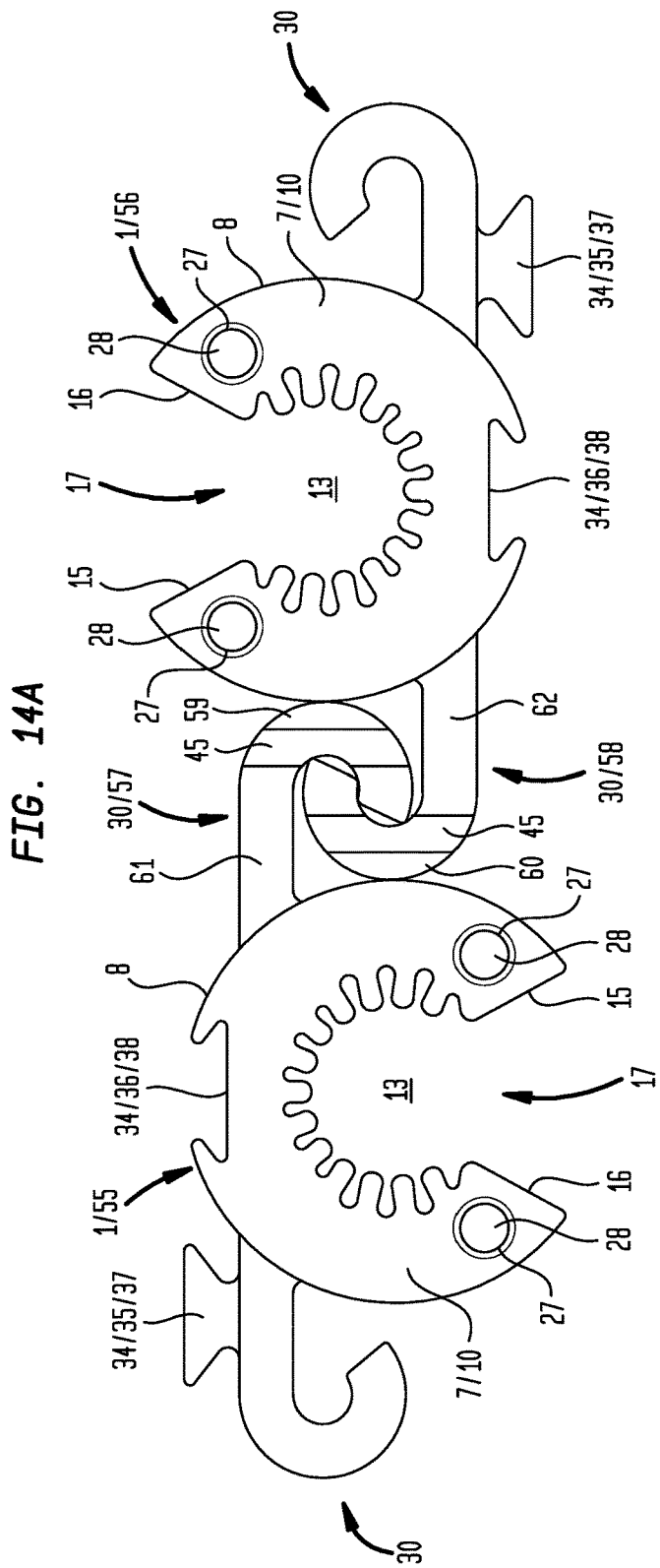
FIG. 14A is an illustration of a method of using a particular embodiment of a coupler.
Figure 14B:
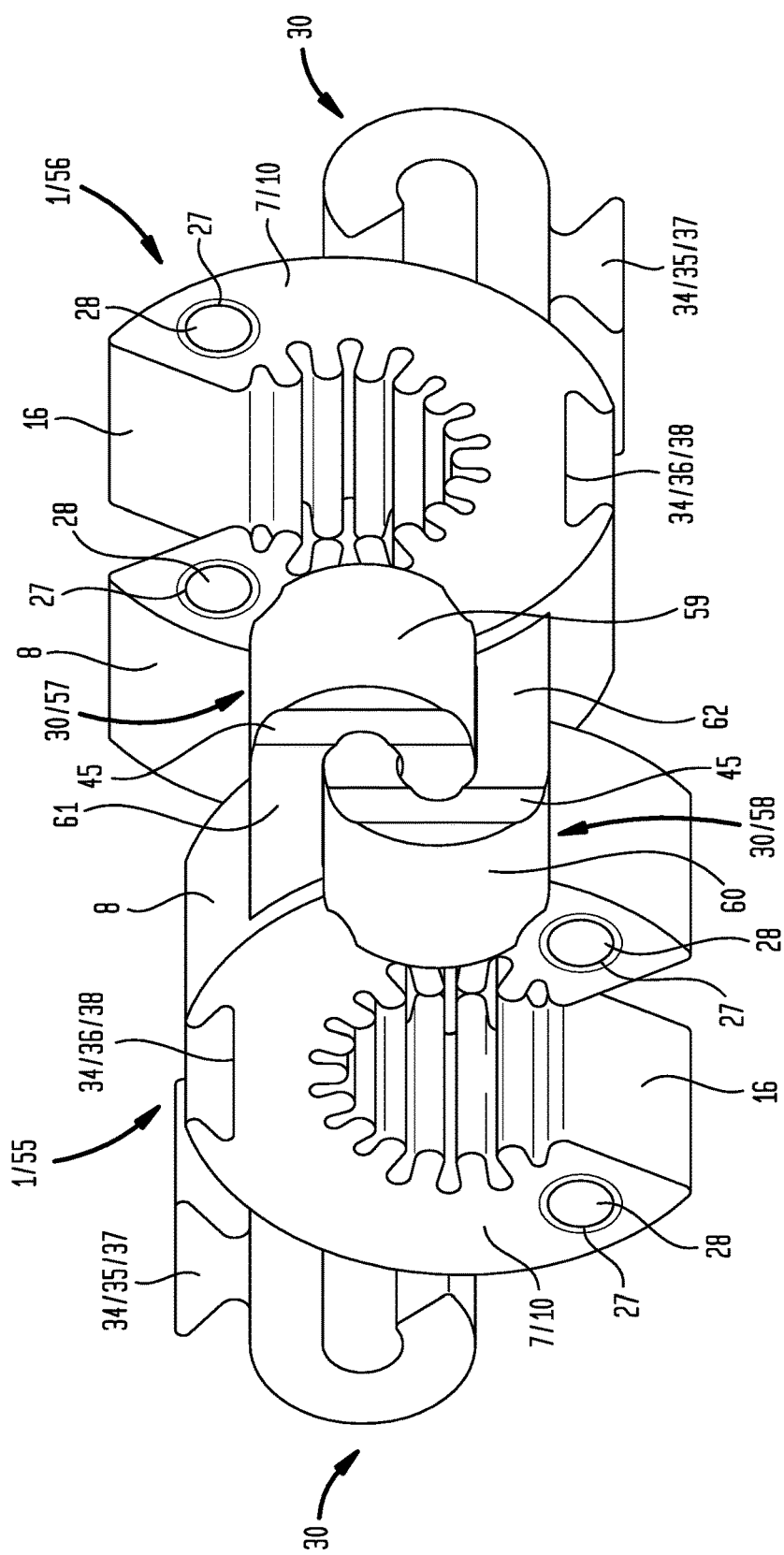
FIG. 14B is an illustration of a method of using a particular embodiment of a coupler.

Now referring primarily to FIG. 14A and FIG. 14B, a method of using the coupler (1) can include obtaining a first coupler (55) further including a first coupler resiliently deformable hook element (57) outwardly extending from the annular body outer surface (8) of the first coupler (55); obtaining a second coupler (56) further including a second coupler resiliently deformable hook element (58) outwardly extending from the annular body outer surface (8) of the second coupler (56); and resiliently deforming the first and second coupler resiliently deformable hook elements (57) (58) to engage a first coupler resiliently deformable hook element hook portion (59) with a second coupler resiliently deformable hook element hook portion (60) to couple the first and second couplers (55)(56).

As to particular embodiments, the method of using the coupler (1) can further include engaging the first and second coupler resiliently deformable hook element hook portions (59)(60) such that the first and second coupler resiliently deformable hook elements (57)(58) have corresponding first and second coupler resiliently deformable hook element shank portions (61)(62) disposed in generally parallel relation. Accordingly, the first and second couplers (55)(56) can be coupled such that the corresponding internal openings (13) dispose in planar relation with one another (as shown in the example of FIG. 14A). As to particular embodiments, this configuration of coupled couplers (1) can be particularly secure.

As to particular embodiments, the method of using the coupler (1) can further include engaging the first and second coupler resiliently deformable hook element hook portions (59)(60) such that the first and second coupler resiliently deformable hook elements (57)(58) have corresponding first and second coupler resiliently deformable hook element shank portions (61)(62) disposed in generally perpendicular relation. Accordingly, the first and second couplers (55)(56) can be coupled such that the corresponding internal openings (13) dispose in orthogonal relation with one another (as shown in the example of FIG. 14B). As to particular embodiments, this configuration of coupled couplers (1) can be particularly secure.

In the above described ways as well as additional ways, a plurality of couplers (1) can be interconnected.

As to particular embodiments, the method of using the coupler (1) can further include coupling the coupler with an auxiliary element.

As can be easily understood from the foregoing, the basic concepts of the present invention may be embodied in a variety of ways. The invention involves numerous and varied embodiments of a radially slotted annular coupling system and methods for making and using such radially slotted annular coupling systems including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "coupler" should be understood to encompass disclosure of the act of "coupling"—whether explicitly discussed or not—and, conversely, were there effectively disclosure of the act of "coupling", such a disclosure should be understood to encompass disclosure of a "coupler" and even a "means for coupling". Such alternative terms for each element or step are to be understood to be explicitly included in the description.

In addition, as to each term used it should be understood that unless its utilization in this application is inconsistent with such interpretation, common dictionary definitions should be understood to included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the radially slotted annular coupling systems herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

I claim:

1. A coupler for mounting on a plant support, comprising: an annular body comprising:

an annular body outer surface and an annular body inner surface connecting opposed annular body first and second faces;

only one internal opening (i) bounded by said annular body internal surface and (ii) communicating between said opposed annular body first and second faces;

opposed annular body first and second ends which connect said annular body outer and inner surfaces and said annular body first and second faces to define a radial slot which communicates with said internal opening;

wherein said annular body is sufficiently resiliently flexible to provide an adjustable radial slot width of said radial slot;

a plurality of spaced apart teeth radially inwardly projecting from said annular body inner surface;

a hook element coupled to said annular body; and a pair of opposed elongate recesses disposed within said hook element, each said elongate recess extending across one of two opposing hook element faces proximate a hook element tip.

2. The coupler of claim 1, wherein said hook element tip is configured to removably matably engage with a female connector interior cavity of a female connector of another said coupler.

3. A coupler for mounting on a plant support, comprising:
an annular body comprising:

an annular body outer surface and an annular body inner surface connecting opposed annular body first and second faces;

only one internal opening (i) bounded by said annular body internal surface and (ii) communicating between said opposed annular body first and second faces;

opposed annular body first and second ends which connect said annular body outer and inner surfaces and said annular body first and second faces to define a radial slot which communicates with said internal opening;

wherein said annular body is sufficiently resiliently flexible to provide an adjustable radial slot width of said radial slot; and wherein said annular body is devoid of a hinge;

a plurality of spaced apart teeth radially inwardly projecting from said annular body inner surface; and a hole disposed in said annular body;

wherein said hole is disposed proximate one of said opposed annular body first and second ends; and wherein said hole bounds a hole opening which passes through said annular body between said annular body first and second faces.

4. The coupler of claim 3, further comprising a pair of said holes, each disposed proximate one of said opposed annular body first and second ends.

5. The coupler of claim 3, further comprising a hook element coupled to said annular body.

6. The coupler of claim 5, further comprising at least one of:

a female connector having a female connector interior cavity; or a male connector having a male connector protruding portion;

wherein said female connector interior cavity is configured to removably matably engage with said male connector protruding portion of another said coupler; and wherein said male connector protruding portion is configured to removably matably engage with said female connector interior cavity of another said coupler.

7. The coupler of claim 3, wherein said internal opening has a generally elliptical internal opening cross section.

8. A coupler for mounting on a plant support, comprising:
an annular body comprising:

an annular body outer surface and an annular body inner surface connecting opposed annular body first and second faces;

only one internal opening (i) bounded by said annular body internal surface and (ii) communicating between said opposed annular body first and second faces;

opposed annular body first and second ends which connect said annular body outer and inner surfaces and said annular body first and second faces to define a radial slot which communicates with said internal opening;

wherein said annular body is sufficiently resiliently flexible to provide an adjustable radial slot width of said radial slot;

a plurality of spaced apart teeth radially inwardly projecting from said annular body inner surface; and a pair of hook elements coupled to said annular body opposite one another, each said hook element comprising a shank portion connected to an arcuate hook portion;

wherein said shank portion outwardly extends from said annular body outer surface and said hook portion inwardly returns toward said annular body outer surface.

9. The coupler of claim 8, further comprising an aperture element bounding an aperture element opening which passes through said annular body between said annular body first and second faces.

10. The coupler of claim 9, further comprising at least one of:

a female connector having a female connector interior cavity; or a male connector having a male connector protruding portion;

wherein said female connector interior cavity is configured to removably matably engage with said male connector protruding portion of another said coupler; and wherein said male connector protruding portion is configured to removably matably engage with said female connector interior cavity of another said coupler.

11. The coupler of claim 8, wherein said internal opening has a generally elliptical internal opening cross section.

12. A coupler for mounting on a plant support, comprising:
an annular body comprising:

an annular body outer surface and an annular body inner surface connecting opposed annular body first and second faces;

only one internal opening (i) bounded by said annular body internal surface and (ii) communicating between said opposed annular body first and second faces;

opposed annular body first and second ends which connect said annular body outer and inner surfaces and said annular body first and second faces to define a radial slot which communicates with said internal opening;

wherein said annular body is sufficiently resiliently flexible to provide an adjustable radial slot width of said radial slot;

wherein said annular body is devoid of a hinge;

a plurality of spaced apart teeth radially inwardly projecting from said annular body inner surface;

a female connector having a female connector interior cavity inwardly extending into said annular body outer surface opposite said radial slot;

wherein said female connector interior cavity is configured to removably matably engage with a male connector of another said coupler to secure a pair of said couplers to one another;

wherein said male connector comprises a male connector protruding portion configured to removably matably engage with said female connector interior cavity; and a hook element coupled to said annular body.

13. The coupler of claim 12, wherein said male connector is coupled to said hook element.

14. The coupler of claim 13, further comprising an aperture element bounding an aperture element opening which passes through said annular body between said annular body first and second faces.

15. A coupler for mounting on a plant support, comprising:

an annular body comprising:
an annular body outer surface and an annular body inner surface connecting opposed annular body first and second faces;

only one internal opening (i) bounded by said annular body internal surface and (ii) communicating between said opposed annular body first and second faces;

opposed annular body first and second ends which connect said annular body outer and inner surfaces and said annular body first and second faces to define a radial slot which communicates with said internal opening;

wherein said opposed annular body first and second ends do not outwardly extend from said annular body outer surface;

wherein said opposed annular body first and second ends which define said radial slot dispose in angled relation to one another such that said radial slot outwardly flares from said annular body inner surface to said annular body outer surface;

wherein said annular body is sufficiently resiliently flexible to provide an adjustable radial slot width of said radial slot;

wherein said annular body is devoid of a hinge;

a plurality of spaced apart teeth radially inwardly projecting from said annular body inner surface; and a hook element coupled to said annular body; an aperture element bounding an aperture element opening which passes through said annular body between said annular body first and second faces.

16. The coupler of claim 15, further comprising at least one of:

a female connector having a female connector interior cavity; or a male connector having a male connector protruding portion;

wherein said female connector interior cavity is configured to removably matably engage with said male connector protruding portion of another said coupler; and wherein said male connector protruding portion is configured to removably matably engage with said female connector interior cavity of another said coupler.

\* \* \* \* \*